(12) United States Patent
Itagaki

(10) Patent No.: US 8,718,847 B2
(45) Date of Patent: May 6, 2014

(54) CONTROL APPARATUS AND CONTROL METHOD FOR HYBRID VEHICLE

(75) Inventor: Kenji Itagaki, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 531 days.

(21) Appl. No.: 12/991,959

(22) PCT Filed: Oct. 14, 2008

(86) PCT No.: PCT/JP2008/068539
§ 371 (c)(1),
(2), (4) Date: Nov. 10, 2010

(87) PCT Pub. No.: WO2010/044132
PCT Pub. Date: Apr. 22, 2010

(65) Prior Publication Data
US 2011/0066311 A1 Mar. 17, 2011

(51) Int. Cl.
*B60L 15/32* (2006.01)

(52) U.S. Cl.
USPC .......................................... 701/22; 903/902

(58) Field of Classification Search
USPC .......... 701/22; 477/7, 20; 180/65.28, 65.285, 180/65.1, 65.21, 65.23, 65.24, 65.29, 180/65.31; 903/902, 903
See application file for complete search history.

(56) References Cited

U.S. PATENT DOCUMENTS

| 5,661,380 | A  | * | 8/1997  | Obara et al.  | 318/139  |
| 6,335,574 | B1 | * | 1/2002  | Ochiai et al. | 290/40 C |
| 6,362,580 | B1 | * | 3/2002  | Omata et al.  | 318/139  |
| 7,443,117 | B2 | * | 10/2008 | Egami et al.  | 318/139  |
| 8,234,025 | B2 | * | 7/2012  | Conlon et al. | 701/22   |

FOREIGN PATENT DOCUMENTS

| EP | 1 920 985 A1    | 5/2008  |
| JP | 8-251714 A      | 9/1996  |
| JP | 2003-209969 A   | 7/2003  |
| JP | 2007-62639 A    | 3/2007  |
| JP | 2007-98981 A    | 4/2007  |
| JP | 2007-244093 A   | 9/2007  |
| JP | 2007-269249 A   | 10/2007 |
| JP | 2007-335151 A   | 12/2007 |
| JP | 2008-109840 A   | 5/2008  |

\* cited by examiner

*Primary Examiner* — Dalena Tran
(74) *Attorney, Agent, or Firm* — Kenyon & Kenyon LLP

(57) ABSTRACT

In a hybrid vehicle including a master power supply always connected to an MG (Motor-Generator) during driving and a first slave power supply and a second slave power supply capable of switching of a connection state with the MG during driving, an ECU connects one of the first slave power supply and the second slave power supply and executes EV ("Electric Vehicle") driving control with the master power supply and one of the slave power supplies, until both of the State of Charge ("SOC") of the first slave power supply and the State of Charge of the second slave power supply drop below a threshold value. On the other hand, when both SOCs drop below the threshold value, the ECU disconnects both of the first slave power supply and the second slave power supply and executes HV ("Hybrid Vehicle") driving control only with the master power supply.

18 Claims, 5 Drawing Sheets

CONTROL APPARATUS AND CONTROL METHOD FOR HYBRID VEHICLE

This is a 371 national phase application of PCT/JP2008/068539 filed 14 Oct. 2008, the content of which is incorporated herein by reference.

TECHNICAL FIELD

The present invention relates to control of a hybrid vehicle and more particularly to control of a hybrid vehicle including a plurality of power supplies capable of sending and receiving power to/from a rotating electric machine serving as a motive power source.

BACKGROUND ART

A hybrid vehicle is provided with a power supply capable of sending/receiving electric power to/from a rotating electric machine. Japanese Patent Laying-Open No. 2003-209969 (Patent Document 1) discloses a hybrid vehicle including a power supply control system for using a high voltage inverter and a motor in a low voltage battery module.

The power supply control system disclosed in Japanese Patent Laying-Open No. 2003-209969 (Patent Document 1) includes at least one inverter providing adjusted electric power to a vehicular traction motor and a plurality of power supply stages, each having a battery and a boost/buck DC-DC converter, arranged in parallel for providing DC power to at least one inverter. The power supply stages are controlled so that output voltage to at least one inverter is maintained.

Patent Document 1: Japanese Patent Laying-Open No. 2003-209969
Patent Document 2: Japanese Patent Laying-Open No. 2008-109840
Patent Document 3: Japanese Patent Laying-Open No. 2007-335151

DISCLOSURE OF THE INVENTION

Problems to be Solved by the Invention

In general, hybrid vehicles have an electric driving mode and a hybrid driving mode as driving modes. Voltage ranges for supply to motors are different between these driving modes. More specifically, in the hybrid driving mode, motive power from both engines and motors are used to drive vehicles and therefore, as compared with the electric driving mode using only motive power from motors, voltage to be supplied to motors can be set low.

Japanese Patent Laying-Open No. 2003-209969 (Patent Document 1) discloses a hybrid vehicle including a plurality of power supplies capable of sending/receiving electric power to/from a motor. However, no mention is made of how to control the connection state between the power supplies and the motor according to the driving modes and of a value set as output voltage of each power supply in consideration of the driving modes and the connection state of the plurality of power supplies.

The present invention is made to solve the aforementioned problem. An object of the present invention is to provide a control apparatus and a control method capable of setting power supply voltage at a time of hybrid driving control at an optimum value while ensuring power supply capacity necessary in the electric driving mode, in a hybrid vehicle having the electric driving mode and the hybrid driving mode as driving modes.

Means for Solving the Problems

A control apparatus in accordance with the present invention controls a hybrid vehicle having at least one of an internal combustion engine and a rotating electric machine as a motive power source. The control apparatus includes: a main power supply connected to the rotating electric machine to be capable of sending/receiving electric power to/from the rotating electric machine; a plurality of sub-power supplies capable of sending/receiving electric power to/from the rotating electric machine; a switching device provided between the plurality of sub-power supplies and the rotating electric machine and configured to be able to connect any one of the plurality of sub-power supplies to the rotating electric machine in accordance with a given command; a switching control portion controlling the switching device; and a driving control portion executing either driving control of hybrid driving control in which the hybrid vehicle is driven with motive power of at least one of the internal combustion engine and the rotating electric machine and electric driving control in which the hybrid vehicle is driven with motive power of the rotating electric machine without using the internal combustion engine. The switching control portion controls the switching device such that the number of the sub-power supplies connected to the rotating electric machine is smaller during the hybrid driving control than during the electric driving control.

Preferably, the switching control portion connects any one of the plurality of sub-power supplies to the rotating electric machine during the electric driving control and disconnects the plurality of sub-power supplies from the rotating electric machine during the hybrid driving control.

Further preferably, when a state of charge of a first sub-power supply connected to the rotating electric machine out of the plurality of sub-power supplies drops below a prescribed state during the electric driving control, the switching control portion disconnects the first sub-power supply from the rotating electric machine and connects another second sub-power supply to the rotating electric machine.

Further preferably, the driving control portion executes the hybrid driving control in place of the electric driving control when states of charge of all of the plurality of sub-power supplies drop below the prescribed state.

Further preferably, the control apparatus further includes an input portion for a driver to input a hybrid driving request indicating that driving under the hybrid driving control is requested. The driving control portion stops the electric driving control and forcedly executes the hybrid driving control when the hybrid driving request is input during the electric driving control. When the hybrid driving control is forcedly executed in response to input of the hybrid driving request, the switching control portion maintains a connection state between the rotating electric machine and any one of the plurality of sub-power supplies at the time when the hybrid driving request is input.

Further preferably, output voltage of the main power supply is set to a value lower than output voltage of any of the plurality of sub-power supplies.

Further preferably, the control apparatus further includes: a first converter provided between the rotating electric machine and the main power supply to convert output voltage of the main power supply into a value within a control voltage range of the rotating electric machine and output the converted output voltage to the rotating electric machine; and a second converter provided between the rotating electric machine and the plurality of sub-power supplies to convert output voltage of the plurality of sub-power supplies into a value within the control voltage range of the rotating electric machine and output the converted output voltage to the rotating electric machine. A first lower limit value of an optimum control voltage range of the rotating electric machine at a time of the hybrid driving control is lower than a second lower limit value of the control voltage range of the rotating electric machine at a time of the electric driving control. Output voltage of the main power supply is set to the first lower limit value, and output voltage of the plurality of sub-power supplies is set to a value between the first lower limit value and the second lower limit value.

Further preferably, a plurality of battery cells connected in series are provided inside of each of the main power supply and the plurality of sub-power supplies. Each of the main power supply and the plurality of sub-power supplies outputs output voltage corresponding to the number of battery cells provided inside thereof. The main power supply is provided with the number of battery cells that brings output voltage of the main power supply to the first lower limit value, out of the total number of battery cells required to keep a possible travel distance at a time of the electric driving control at a prescribed target distance or longer. The plurality of sub-power supplies are each evenly provided with the number of remaining battery cells, excluding the number of battery cells provided for the main power supply, out of the total number of battery cells.

Further preferably, the hybrid vehicle is a plug-in hybrid vehicle capable of charging the main power supply and the plurality of sub-power supplies with electric power from a power supply external to the vehicle.

A control method in accordance with another aspect of the present invention is performed by a control apparatus of a hybrid vehicle having at least one of an internal combustion engine and a rotating electric machine as a motive power source. The control apparatus includes a main power supply connected to the rotating electric machine to be capable of sending/receiving electric power to/from the rotating electric machine, a plurality of sub-power supplies capable of sending/receiving electric power to/from the rotating electric machine, and a switching device provided between the plurality of sub-power supplies and the rotating electric machine and configured to be able to connect any one of the plurality of sub-power supplies to the rotating electric machine in accordance with a given command. The control method includes the steps of: executing either driving control of hybrid driving control in which the hybrid vehicle is driven with motive power of at least one of the internal combustion engine and the rotating electric machine and electric driving control in which the hybrid vehicle is driven with motive power of the rotating electric machine without using the internal combustion engine; and controlling the switching device such that the number of the sub-power supplies connected to the rotating electric machine is smaller during the hybrid driving control than during the electric driving control.

Effects of the Invention

In accordance with the present invention, it is possible to set power supply voltage at a time of hybrid driving control at an optimum value while ensuring power supply capacity necessary in the electric driving mode.

DESCRIPTION OF THE REFERENCE SIGNS 1 power supply system, 2 driving force generation portion, 10-1 to 10-3 power storage device, 11 charging device, 12-1, 12-2 converter, 13 connector, 14-1 to 14-3 current sensor, 15 paddle, 16-1 to 16-3, 20 voltage sensor, 17 HV switch, 18-1, 18-2 switching device, 19 AC power supply, 22 converter ECU, 30-1, 30-2 inverter, 32-1, 32-2 MG, 34 power split device, 36 engine, 38 driving wheel, 100 vehicle, 8000 ECU, 8100 input interface, 8200 operation processing portion, 8210 drive control portion, 8220 SOC calculation portion, 8230 switching control portion, 8300 storage portion, 8400 output interface, MPL main positive bus, MNL main negative bus, C smoothing capacitor, RY1, RY2, RY3 system relay.

BEST MODES FOR CARRYING OUT THE INVENTION

In the following, an embodiment of the present invention will be described with reference to the drawings. It is noted that the same or corresponding parts in the figures are denoted with the same reference signs and a description thereof will not be repeated.

Figure 1:
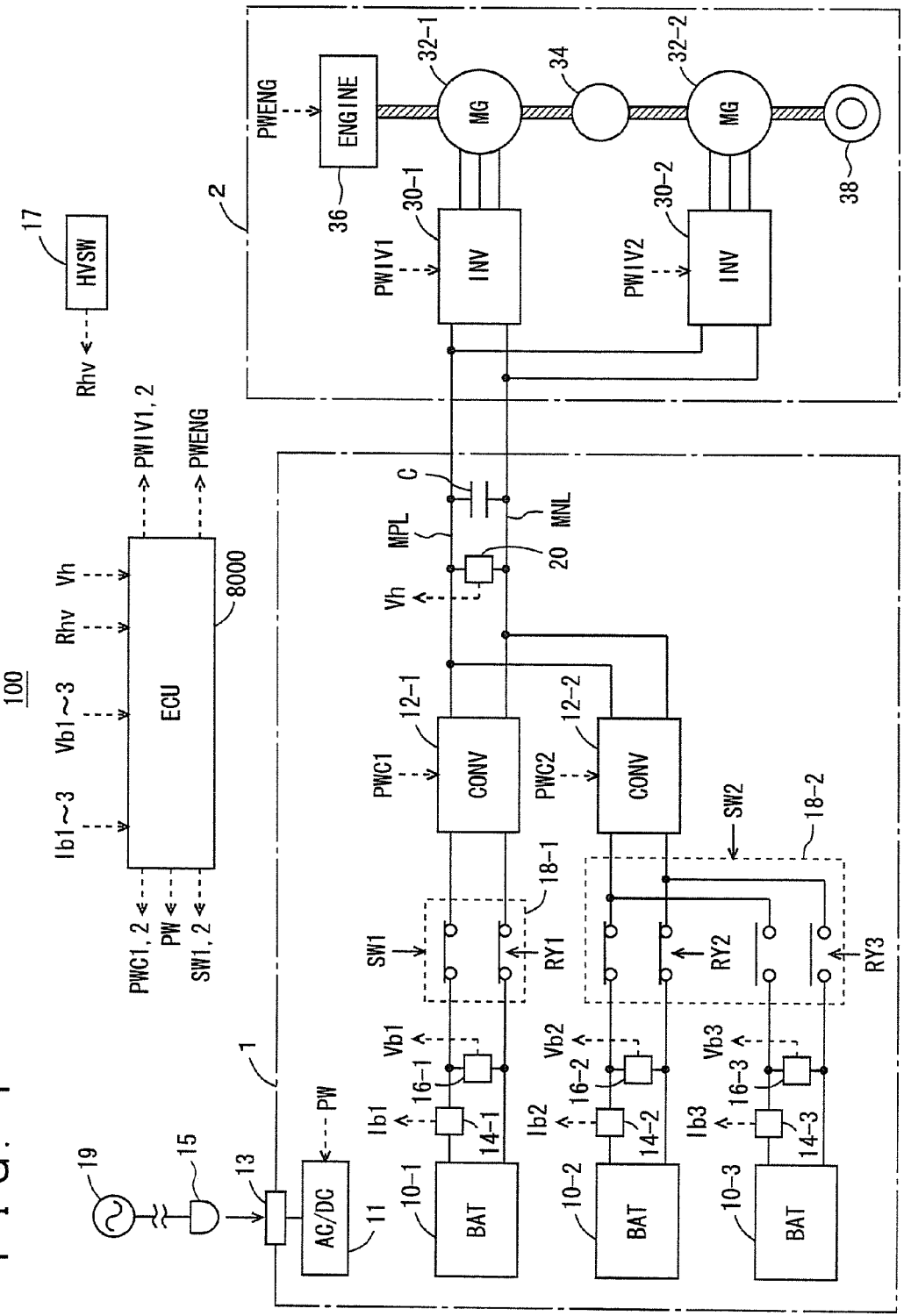
FIG. 1 is an overall block diagram of a vehicle including a control apparatus in accordance with an embodiment of the present invention.

FIG. 1 is an overall block diagram of a vehicle including a control apparatus in accordance with an embodiment of the present invention.

Referring to FIG. 1, a vehicle 100 includes a power supply system 1, a driving force generation portion 2, and an ECU (Electronic Control Unit) 8000.

Driving force generation portion 2 includes a first inverter 30-1, a second inverter 30-2, a first MG (Motor-Generator) 32-1, a second MG 32-2, a power split device 34, an engine 36, and a driving wheel 38.

First MG 32-1, second MG 32-2, and engine 36 are coupled to power split device 34. Then, vehicle 100 runs by driving force from at least one of engine 36 and second MG 32-2. More specifically, vehicle 100 runs in either driving mode of an electric driving mode (hereinafter also referred to as "EV driving mode") and a hybrid driving mode (hereinafter also referred to as "HV driving mode"). The EV driving mode is a driving mode in which vehicle 100 is run by motive power of second MG 32-2 without using motive power of engine 36. The HV driving mode is a driving mode in which vehicle 100 is run by motive power of engine 36 and of second MG 32-2. ECU 8000 performs either control of EV driving control in which vehicle 100 is run in the EV driving mode and HV driving control in which vehicle 100 is run in the HV driving mode.

Motive power generated by engine 36 is split into two paths by power split device 34. Specifically, one is a path for transmission to driving wheel 38 and the other is a path for transmission to first MG 32-1.

Each of first MG 32-1 and second MG 32-2 is an AC rotating electric machine, and is formed of, for example, a three-phase AC rotating electric machine including a rotor having a permanent magnet embedded therein. At a time of HV driving control, engine 36 is operated such that SOC (State Of Charge) which is a value indicating a state of charge of a power storage device (described later) included in power supply system 1 is maintained in a prescribed range (for example, about 40% to 60%), and electric power is generated by first MG 32-1 using motive power of engine 36 that is split by power split device 34. The electric power generated by first MG 32-1 is supplied to power supply system 1.

Second MG 32-2 generates driving force using at least one of electric power supplied from power supply system 1 and electric power generated by first MG 32-1. The driving force of second MG 32-2 is then transmitted to driving wheel 38. At a time of braking of the vehicle, second MG 32-2 is driven by driving wheel 38, and second MG 32-2 operates as a power generator. Thus, second MG 32-2 operates as a regenerative brake converting braking energy into electric power. The electric power generated by second MG 32-2 is then supplied to power supply system 1.

Power split device 34 is formed of a planetary gear including a sun gear, a pinion gear, a carrier, and a ring gear. The pinion gear is engaged with the sun gear and the ring gear. The carrier supports the pinion gear such that the pinion gear can rotate on its own axis, and is coupled to the crankshaft of engine 36. The sun gear is coupled to the rotation shaft of first MG 32-1. The ring gear is coupled to the rotation shaft of second MG 32-2.

First inverter 30-1 and second inverter 30-2 are connected to a main positive bus MPL and a main negative bus MNL. Then, first inverter 30-1 and second inverter 30-2 convert driving power (DC power) supplied from power supply system 1 into AC power for output to first MG 32-1 and second MG 32-2, respectively. Furthermore, first inverter 30-1 and second inverter 30-2 convert AC power generated by first MG 32-1 and second MG32-2, respectively, into DC power for output to power supply system 1 as regenerative power.

Each of first inverter 30-1 and second inverter 30-2 is formed of, for example, a bridge circuit including switching elements of three phases. Then, the inverters perform a switching operation according to the respective driving signals PWI1, PWIV2 from ECU 8000 to drive the corresponding MG.

ECU 8000 calculates vehicle request power Ps based on a detection signal from each not-shown sensor, a driving condition, an accelerator pedal position and the like, and calculates a torque target value and a revolution number target value of first MG 32-1 and second MG 32-2 based on the calculated vehicle request power Ps. Then, ECU 8000 controls first inverter 30-1 and second inverter 30-2 such that generated torque and number of revolutions of first MG 32-1 and second MG 32-2 attain target values.

Power supply system 1 includes a first power storage device 10-1, a second power storage device 10-2, a third power storage device 10-3, a first converter 12-1, a second converter 12-2, a first switching device 18-1, a second switching device 18-2, a main positive bus MPL, a main negative bus MNL, a smoothing capacitor C, current sensors 14-1 to 14-3, voltage sensors 16-1 to 16-3, 20, a charging device 11, and a connector 13.

Charging device 11 converts electric power from an AC power supply 19 from an electric utility provided external to the vehicle, into direct current for output to first power storage device 10-1, second power storage device 10-2, and third power storage device 10-3. ECU 8000 controls charging device 11 such that SOCm, SOCs1, SOCs2, which are values indicating the respective states of charge of first power storage device 10-1, second power storage device 10-2, third power storage device 10-3, attain upper limit values (for example, about 80%) when a paddle 15 connected to AC power supply 19 of an electric utility is connected to connector 13 of the vehicle. In other words, vehicle 100 is a vehicle capable of running with electric power supplied from a power supply external to the vehicle. (also referred to as "plug-in vehicle" hereinafter). It is noted that the vehicle to which the control apparatus in accordance with the present invention is applicable is not limited to plug-in vehicles.

Each of first power storage device 10-1, second power storage device 10-2, and third power storage device 10-3 is a DC power supply formed by connecting a plurality of nickel-metal hydride or lithium ion battery cells in series. Output voltage of each of first power storage device 10-1, second power storage device 10-2, and third power storage device 10-3 is adjusted by the number of battery cells provided inside. The output voltage (the number of battery cells) of each power storage device will be described later. It is noted that any of first power storage device 10-1, second power storage device 10-2, and third power storage device 10-3 may be, for example, a rechargeable, large-capacitance capacitor.

First power storage device 10-1 is connected to first converter 12-1, and second power storage device 10-2 and third power storage device 10-3 are connected to second switching device 18-2.

First switching device 18-1 is provided between first power storage device 10-1 and first converter 12-1 to switch an electrical connection state between first power storage device 10-1 and first converter 12-1 in accordance with a switching signal SW1 from ECU 8000. More specifically, first switching device 18-1 includes a system relay RY1. When switching signal SW1 is inactivated, system relay RY1 is turned on, and when switching signal SW1 is activated, system relay RY1 is turned on. Switching signal SW1 is activated when a not-shown ignition switch is turned on by the user. In other words, at a time of driving of vehicle 100, system relay RY1 is kept on.

Second switching device 18-2 is provided between second power storage device 10-2 and third power storage device 10-3 and second converter 12-2 to switch an electrical connection state between second power storage device 10-2 and third power storage device 10-3 and second converter 12-2 in accordance with a switching signal SW2 from ECU 8000. More specifically, second switching device 18-2 includes system relays RY2, RY3. System relay RY2 is disposed between second power storage device 10-2 and second converter 12-2. System relay RY3 is disposed between third power storage device 10-3 and second converter 12-2. Then, ECU 8000 generates switching signal SW2 for controlling on/off of each of system relays RY2, RY3 for output to second switching device 18-2.

First converter 12-1 and second converter 12-2 are connected to main positive bus MPL and main negative bus MNL in parallel with each other. First converter 12-1 performs voltage conversion between first power storage device 10-1 and main positive bus MPL and main negative bus MNL based on a driving signal PWC1 from ECU 8000. Second converter 12-2 performs voltage conversion between main positive bus MPL and main negative bus MNL and one of second power storage device 10-2 and third power storage device 10-3 electrically connected to second converter 12-2 by second switching device 18-2, based on a driving signal PWC2 from ECU 8000.

Smoothing capacitor C is connected between main positive bus MPL and main negative bus MNL to reduce power variation components included in main positive bus MPL and main negative bus MNL. Voltage sensor 20 detects voltage Vh between main positive bus MPL and main negative bus MNL and outputs the detected value to ECU 8000. It is noted that voltage Vh is voltage input to first inverter 30-1 and second inverter 30-2. In the following, this voltage Vh is also referred to as "system voltage Vh."

Current sensors 14-1 to 14-3 detect current Ib input/output to/from first power storage device 10-1, current Ib2 input/output to/from second power storage device 10-2, and current Ib3 input/output to/from third power storage device 10-3, respectively, and output the detected values to ECU 8000. It is noted that each of current sensors 14-1 to 14-3 detects current (discharging current) output from the corresponding power storage device as a positive value and detects current (charging current) input to the corresponding power storage device as a negative value. Although FIG. 1 shows that current sensor 14-1 to 14-3 each detect current of the positive line, current sensors 14-1 to 14-3 may detect current of the negative line.

Voltage sensors 16-1 to 16-3 detect voltage Vb1 of first power storage device 10-1, voltage Vb2 of second power storage device 10-2, and voltage Vb3 of third power storage device 10-3, respectively, and output the detected values to ECU 8000.

ECU 8000 generates driving signals PWC1, PWC2 for driving first converter 12-1 and second converter 12-2, respectively, driving signals PWIV1, PWIV2 for driving first inverter 30-1 and second inverter 30-2, respectively, and PWENG for controlling engine 36, based on the detected values from current sensors 14-1 to 14-3 and voltage sensors 16-1 to 16-3, 20, and vehicle request power Ps. Then, ECU 8000 outputs the generated driving signals PWC1, PWC2, PWIV1, PWIV2, PWENG to first converter 12-1, second converter 12-2, first inverter 30-1, second inverter 30-2, and engine 36, respectively.

Here, in a discharging mode (i.e. vehicle request power Ps>0) in which electric power is supplied from power supply system 1 to driving force generation portion 2, ECU 8000 calculates a discharge distribution ratio indicating distribution of power discharged from first power storage device 10-1 and the power storage device electrically connected to second converter 12-2 by second switching device 18-2, in accordance with a ratio between the allowable discharge power of first power storage device 10-1 connected to first converter 12-1 and the total allowable discharge power of second power storage device 10-2 and third power storage device 10-3 connectable to second converter 12-2 by second switching device 18-2. Then, ECU 8000 controls first converter 12-1 and second converter 12-2 according to the calculated discharge distribution ratio.

On the other hand, in a charging mode (i.e. vehicle request power Ps<0) in which electric power is supplied from driving force generation portion 2 to power supply system 1, ECU 8000 calculates a charge distribution ratio indicating distribution of power charged to power storage device 10-1 and the power storage device connected to second converter 12-2, in accordance with a ratio between the allowable charging power of first power storage device 10-1 and the allowable charging power of the power storage device electrically connected to second converter 12-2 by second switching device 18-2. Then, ECU 8000 controls first converter 12-1 and second converter 12-2 according to the calculated charge distribution ratio.

Vehicle 100 is further provided with an HV switch 17. HV switch 17 is a switch for the driver to input an HV request indicating that HV driving is requested. When the driver turns on HV switch 17, HV switch 17 outputs an HV request signal Rhv to ECU 8000.

ECU 8000 executes one of EV driving control and HV driving control, based on vehicle request power Ps, SOC of each power supply, and HV request signal Rhv from HV switch 17.

At a time of HV driving control, power generation or regeneration by each MG and motor output are controlled such that SOC of each power supply falls within a prescribed range. For example, ECU 8000 increases a charge amount for each power supply by increasing the power generation amount by each MG by starting the stopped engine 36 or increasing output of the operated engine 36 when charging of each power supply is necessary, as described above.

ECU 8000 controls at least one of first converter 12-1 and second converter 12-2 thereby to adjust system voltage Vh to a value that falls within an optimum voltage range (hereinafter also simply referred to as "voltage control range") for operating each MG.

Figure 2:
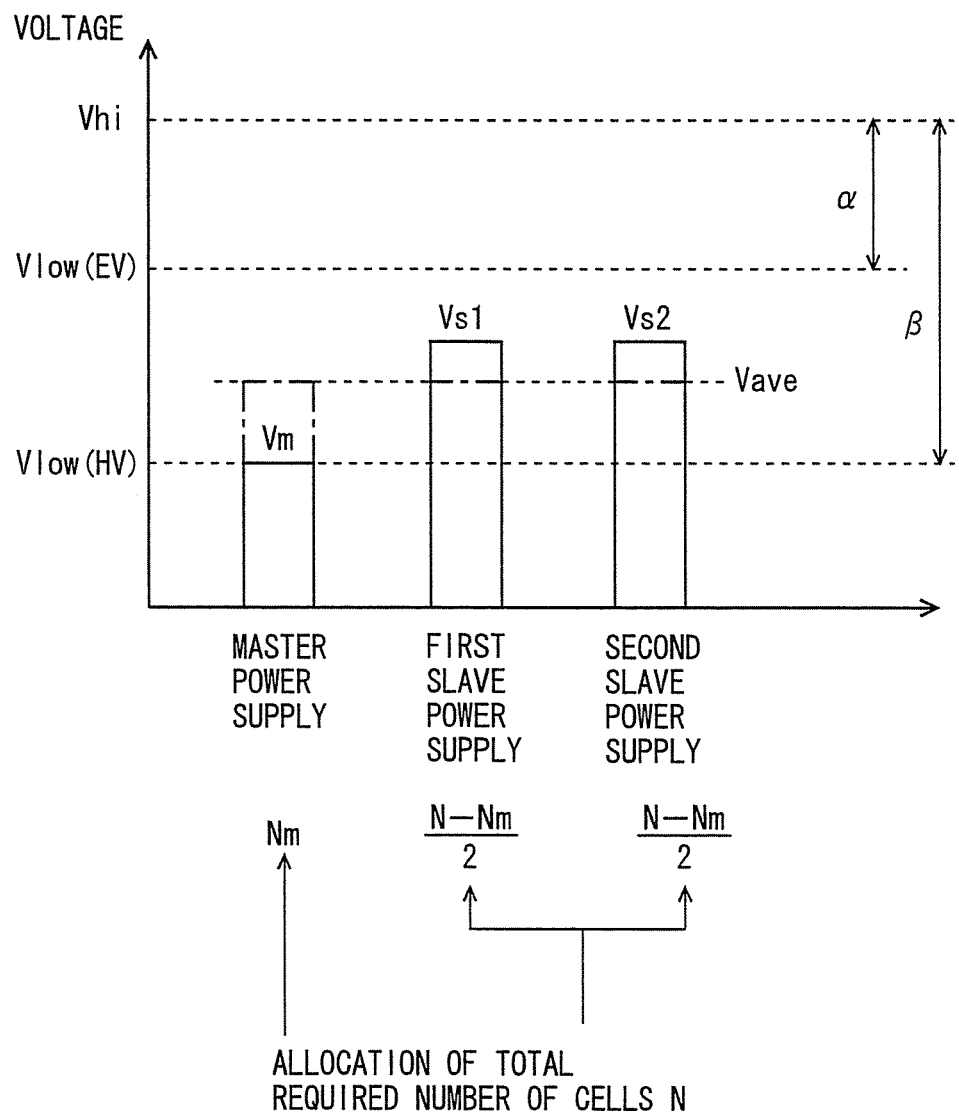
FIG. 2 is a diagram showing the relation between a voltage control range at a time of EV driving control, a voltage control range at a time of HV driving control, and output voltage of each power storage device.

FIG. 2 shows the relation between the above-noted voltage control range and the output voltage of each power storage device. In the following description, first power storage device 10-1, second power storage device 10-2, and third power storage device 10-3 are also referred to as "master power supply," "first slave power supply," and "second slave power supply," respectively.

As shown in FIG. 2, voltage control range α at a time of EV driving control is a range from a lower limit value Vlow (EV) to an upper limit value Vhi. On the other hand, voltage control range β is a range from a lower limit value Vlow (HV) to upper limit value Vhi. Lower limit value Vlow (EV) is a value higher than lower limit value Vlow (HV). For example, upper limit value Vhi may be about 650 volts, lower limit value Vlow (EV) may be about 500 volts, and lower limit value Vlow (HV) may be a value of about 200 volts.

ECU 8000 controls at least one of first converter 12-1 and second converter 12-2 such that system voltage Vh falls within voltage control range α at a time of EV driving control and that system voltage Vh falls within voltage control range β at a time of HV driving control.

Output voltage Vm of the master power supply (first power storage device 10-1) is set to lower limit value Vlow(HV) of voltage control range β at a time of HV driving control. Output voltage Vs1 of the first slave power supply (second power storage device 10-2) and output voltage Vs2 of the second slave power supply (third power storage device 10-3) are set to a value between lower limit value Vlow (HV) and lower limit value Vlow (EV).

The allocation of battery cells of the master power supply, the first slave power supply, and the second slave power supply for realizing such output voltage will be described below.

When the number of battery cells necessary to realize a prescribed possible target travel distance in EV driving is N, first, the number of battery cells Nm of the master power supply is determined such that output voltage Vm of the master power supply becomes lower limit value Vlow (HV). Then, (N−Nm) battery cells, which are the remainder obtained by subtracting the number of battery cells Nm of the master power supply from the required total number of cells N, are allocated to the first slave power supply and the second slave power supply. In the present embodiment, the remainder (N−Nm) battery cells are evenly allocated to the first slave power supply and the second slave power supply. In other words, {(N−Nm)/2} battery cells are allocated to each of the first slave power supply and the second slave power supply.

Accordingly, output voltage Vs1 of the first slave power supply has a value equal to that of output voltage Vs2 of the second slave power supply.

For example, when the output voltage of one battery cell is about 3.6 volts, the total required number of cells N is 288, and lower limit value Vlow (HV) is about 200 volts, 116 battery cells are allocated to each of the first slave power supply and the second slave power supply where the number of battery cells Nm of the master power supply is 56. Accordingly, Vm=about 201 volts, Vs1=Vs2=about 417 volts.

Voltage value Vave represented by the alternate long and short dashed lines in FIG. 2 represents output voltage of each power supply in a case where the total required number of cells N are evenly allocated to three power supplies, namely, the master power supply, the first slave power supply, and the second slave power supply.

Figure 3:
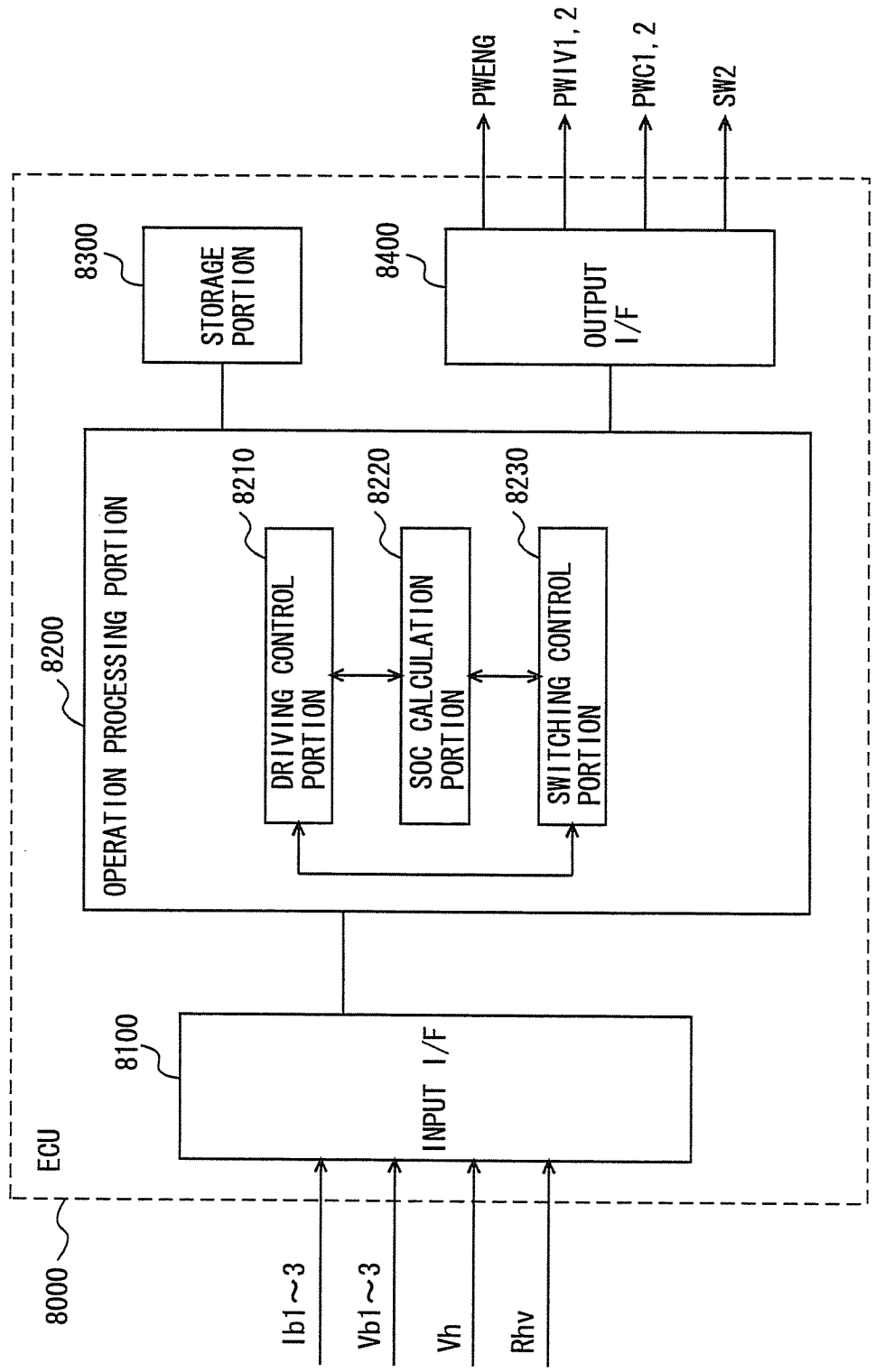
FIG. 3 is a functional block diagram of the control apparatus in accordance with an embodiment of the present invention.

FIG. 3 is a functional block diagram of ECU 8000 which is the control apparatus of the vehicle in accordance with the present embodiment. ECU 8000 includes an input interface 8100, an operation processing portion 8200, a storage portion 8300, and an output interface 8400.

Input interface 8100 receives a detection result of each sensor and the like and transmits the same to operation processing portion 8200.

A variety of information, programs, threshold values, maps, and the like are stored in storage portion 8300, and the data is read from operation processing portion 8200 and stored as necessary.

Operation processing portion 8200 includes a driving control portion 8210, an SOC calculation portion 8220, and a switching control portion 8230.

Driving control portion 8210 executes either one of EV driving control and HV driving control based on SOC of each power supply, HV request signal Rhv, and the like. When either of SOCs1 of the first slave power supply and SOCc2 of the second slave power supply exceeds a prescribed threshold value (for example, 20%), driving control portion 8210 executes EV driving control. When both of SOCs1 of the first slave power supply and SOCc2 of the second slave power supply drop below the threshold value, driving control portion 8210 executes HV driving control. Furthermore, when HV request signal Rhv is received during EV driving control, driving control portion 8210 stops EV driving control and forcedly executes HV driving control. In the following description, the HV driving control executed based on HV request signal Rhv is also referred to as "forced HV driving control" in order to distinguish from the normal HV driving control.

In addition, driving control portion 8210 switches the control range of system voltage Vh depending on the executed driving control. More specifically, driving control portion 8210 controls at least one of first converter 12-1 and second converter 12-2 such that system voltage Vh falls within the aforementioned voltage control range α at a time of HV driving control and that system voltage Vh falls within the aforementioned voltage control range β at a time of HV driving control.

Driving control portion 8210 generates driving signals PWC1, PWC2, PWIV1, PWIV2, PWENG for realizing these controls and outputs the generated driving signals to first converter 12-1, second converter 12-2, first inverter 30-1, second inverter 30-2, and engine 36, respectively, via output interface 8400.

SOC calculation portion 8220 calculates SOCm of the master power supply, SOCs1 of the first slave power supply, SOCs2 of the second slave power supply, based on the respective detection values from current sensors 14-1 to 14-3 and voltage sensors 16-1 to 16-3, 20.

Switching control portion 8230 generates switching signal SW2 for switching the electrical connection state between the first slave power supply and the second slave power supply and second converter 12-2, based on the executed driving control and SOC of each power supply, and outputs the generated switching signal to second switching device 18-2 via output interface 8400.

When SOCs1 of the first slave power supply exceeds the threshold value, switching control portion 8230 generates switching signal SW2 so as to connect the first slave power supply and disconnect the second slave power supply (to turn on system relay RY2 and turn off system relay RY3).

When SOCs1 of the first slave power supply drops below the threshold value and SOCs2 of the second slave power supply exceeds the threshold value, switching control portion 8230 generates switching signal SW2 so as to disconnect the first slave power supply and connect the second slave power supply (to turn off system relay RY2 and turn on system relay RY3).

When both of SOCs1 of the first slave power supply and SOCs2 of the second slave power supply drop below the threshold value, switching control portion 8230 generates switching signal SW2 so as to disconnect both of the first slave power supply and the second slave power supply (to turn off both of system relays RY2 and RY3).

It is noted that when the forced HV driving control is executed in response to reception of HV request signal Rhv during EV driving control, switching control portion 8230 does not generate switching signal SW2 for disconnecting both of the first slave power supply and the second slave power supply but maintains switching signal SW2 at the time of reception of HV request signal Rhv as it is.

The aforementioned functions may be implemented by software or may be implemented by hardware. The following description will be made for a case where the aforementioned functions are implemented by software, specifically, where CPU which is operation processing portion 8200 executes a program stored in storage portion 8300 to implement the aforementioned functions.

Figure 4:
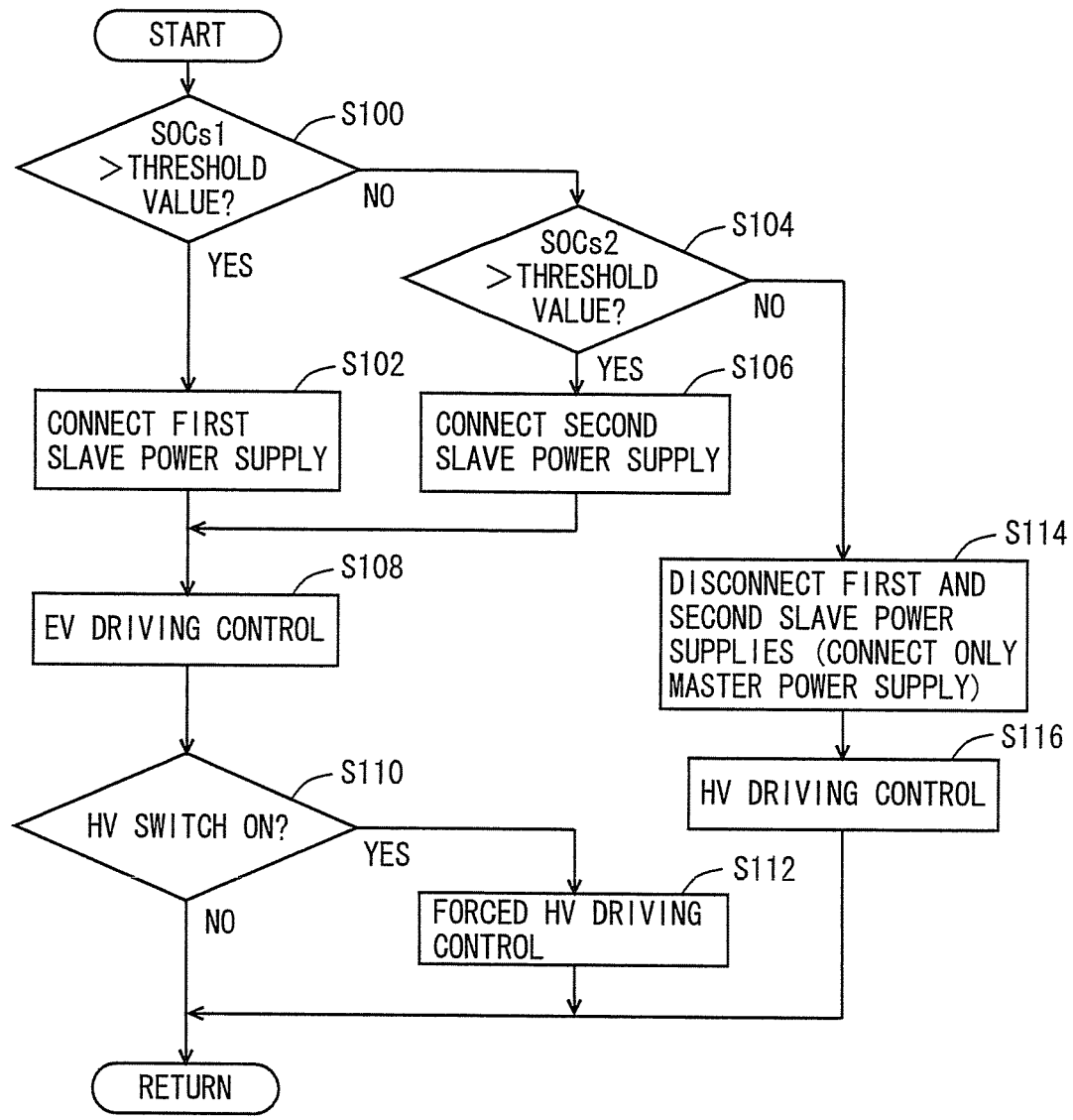
FIG. 4 is a flowchart showing a control structure of the control apparatus in accordance with an embodiment of the present invention.

In the following, a control structure of a program executed in ECU 8000 which is the control apparatus in accordance with the present embodiment will be described with reference to FIG. 4. It is noted that this program is repeatedly executed at a predetermined cycle time.

In step (hereinafter abbreviated as S) 100, ECU 8000 determines whether or not SOCs1 of the first slave power supply exceeds the threshold value. If SOCs1 exceeds the threshold value (YES in S100), the process proceeds to S102. If not (NO in S100), the process proceeds to S104.

In S102, ECU 8000 generates switching signal SW2 for connecting the first slave power supply and disconnecting the second slave power supply and outputs the same to second switching device 18-2. This brings about a state in which the master power supply and the first slave power supply are connected with each inverter.

In S104, ECU 8000 determines whether or not SOCs2 of the second slave power supply exceeds the threshold value. If SOCs2 exceeds the threshold value (YES in S104), the process proceeds to S106. If not (NO in S104), the process proceeds to S108.

In S106, ECU 8000 generates switching signal SW2 for disconnecting the first slave power supply and connecting the second slave power supply and outputs the same to second switching device 18-2. This brings about a state in which the master power supply and the second slave power supply are connected with each inverter.

In S108, ECU 8000 executes EV driving control. At the time of EV driving control, first converter 12-1 and second converter 12-2 are controlled such that system voltage Vh falls within the aforementioned voltage control range α. More specifically, ECU 8000 controls system voltage Vh to lower limit value Vlow (EV) of voltage control range α and in addition, increases system voltage Vh within voltage control range α, as necessary.

In S110, ECU 8000 determines whether or not HV switch 17 is turned on by the driver (whether HV request signal Rhv is received or not) during EV driving control. If HV switch 17 is turned on (YES in S110), the process proceeds to S112. If not (NO in S110), the process ends.

In S112, ECU 8000 executes the forced HV driving control. It is noted that at a time of the forced HV driving control, switching signal SW2 at the time of reception of HV request signal Rhv is maintained as it is.

In S114, ECU 8000 generates switching signal SW2 for disconnecting both of the first slave power supply and the second slave power supply and outputs the same to second switching device 18-2. This brings about a state in which only the master power supply is connected with each inverter.

In S116, ECU 8000 executes the HV driving control. It is noted that at a time of the HV driving control, first converter 12-1 is controlled such that system voltage Vh falls within the aforementioned voltage control range β. More specifically, ECU 8000 controls system voltage Vh to lower limit value Vlow (HV) of voltage control range β and in addition, increases system voltage Vh within voltage control range β, as necessary.

The control operation of ECU 8000 which is the control apparatus in accordance with the present embodiment, based on the structure and flowchart as described above, will be described.

Figure 5:
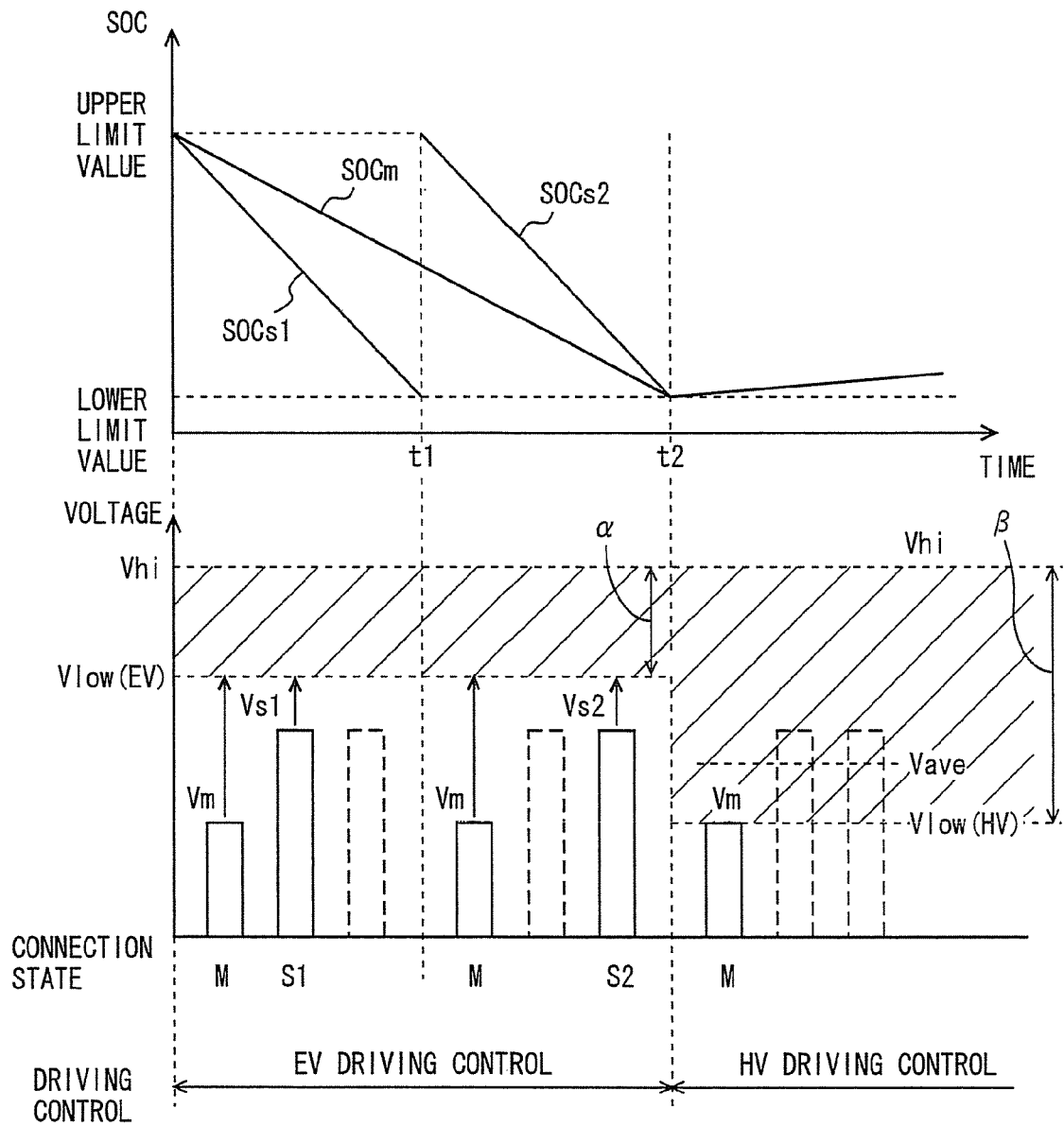
FIG. 5 is a timing chart showing SOC of each power supply controlled by the control apparatus in accordance with an embodiment of the present invention, driving control, a connection state of each power supply.

FIG. 5 is a timing chart showing SOC of each power supply, the executed driving control, a connection state of each power supply when the vehicle is continuously driven after charging up to the upper limit value of SOC (for example, a value of about 80%) of each power supply.

At a time of driving of vehicle 100 (at a time of ignition ON), system relay RY1 is kept on, and therefore the master power supply is always connected with each inverter via first converter 12-1.

Since SOCs1 exceeds the threshold value (YES in S100) immediately after starting of driving, the EV driving control is executed (S108) with the first slave power supply being connected to second converter 12-2 (S102). Therefore, until time t1 when SOCs1 decreases to the threshold value, the EV driving control is performed with electric power of the master power supply and the first slave power supply.

When SOCs1 decreases to the threshold value at time t1 (NO in S100), SOCs2 exceeds the threshold value (YES in S104). Therefore, the first slave power supply is disconnected while the second slave power supply is connected to second converter 12-2 (S106), so that the EV driving control is continuously executed (S108). Until time t2 when SOCs2 decreases to the threshold value, the EV driving control is performed with electric power of the master power supply and the second slave power supply.

Here, as shown in FIG. 5, during the EV driving control, charging/discharging of the master power supply is controlled so that SOCm of the master power supply also attains the lower limit value at the timing when SOCs2 of the second slave power supply reaches the lower limit value.

In this manner, the EV driving control is performed until SOC of each power supply reaches the lower limit value. Here, the total number of battery cells included in each power supply is the total required number of cells N. Therefore, a prescribed possible target travel distance can be achieved with EV driving.

It is noted that lower limit value Vlow (EV) of voltage control range α at a time of EV driving control is higher than output voltage Vm of the master power supply, output voltage Vs1 of the first slave power supply, and output voltage Vs2 of the second slave power supply. Therefore, as shown by the arrows in FIG. 5, at a time of the EV driving control, Vm and Vs1 and Vs2 are increased at least up to lower limit value Vlow (EV) by first converter 12-1 and second converter 12-2, respectively.

When SOCs2 decreases to the threshold value at time t2 (NO in S104), both of the first slave power supply and the second slave power supply are disconnected from second converter 12-2 (S114), and in addition, the EV driving control is switched to the HV driving control (S116). Therefore, after time t2, the HV driving control is performed only with the master power supply.

Here, for example, if the total required number of cells N are evenly allocated to each power supply, the output voltage of the master power supply is Vave shown in FIG. 5, which exceeds lower limit value Vlow (HV) of voltage control range β at a time of HV driving control. As a result, system voltage Vh at a time of HV driving control becomes unnecessarily high, and the optimum voltage setting is not achieved.

Then, in the present embodiment, with only the master power supply used as the power supply at a time of HV driving control, out of the total required number of cells N, Nm battery cells for bringing output voltage Vm of the master power supply to lower limit value Vlow (HV) of voltage control range β at a time of HV driving control are allocated to the master power supply, and the remaining (N−Nm) battery cells are evenly allocated to the first slave power supply and the second slave power supply.

Accordingly, system voltage Vh at a time of HV driving control attains lower limit value Vlow (HV) without a voltage increasing operation by first converter 12-1. Therefore, power loss due to increasing voltage can be reduced. In addition, as compared with when the total required number of cells N are evenly allocated for each power supply, it is possible to prevent system voltage Vh from becoming unnecessarily high and thereby to reduce power consumption.

In the present embodiment, during EV driving control, when HV switch 17 is turned on by the driver (YES in S110), the forced HV driving control is executed (S112). At a time of the forced HV driving control, the connection state with each power supply is kept in the state at the time when HV switch 17 is turned on (at the time when HV request signal Rhv is received). This enables driving with SOC of the main power supply and the slave power supply kept in a prescribed range. Such driving is effective when the driver wants to keep electricity due to some circumstances, for example, when power of each power supply is required after arrival at a destination.

As described above, according to the control apparatus in accordance with the present embodiment, only the master power supply is used for the power supply connected to MG at a time of HV driving control, and out of the total required number of cells, the number of battery cells for bringing the output voltage of the master power supply to the lower limit value of the voltage control range at a time of HV driving control are allocated to the master power supply while the remaining number of battery cells are evenly allocated to the remaining slave power supplies. Accordingly, the system voltage at a time of HV driving control can be set to the optimum voltage while the battery capacity required at a time of EV driving is secured.

Although two slave power supplies are provided in the present embodiment, the present invention is also applicable to a hybrid vehicle having three or more slave power supplies.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

The invention claimed is:

1. A control apparatus of a hybrid vehicle having at least one of an internal combustion engine and a rotating electric machine as a motive power source comprising:
    a main power supply connected to said rotating electric machine capable of sending/receiving electric power to/from said rotating electric machine;
    a plurality of sub-power supplies capable of sending/receiving electric power to/from said rotating electric machine;
    a switching device provided between said plurality of sub-power supplies and said rotating electric machine and configured to be able to connect any one of said plurality of sub-power supplies to said rotating electric machine in accordance with a given command;
    a switching control portion controlling said switching device; and
    a driving control portion executing either driving control of hybrid driving control in which said hybrid vehicle is driven with motive power of at least one of said internal combustion engine and said rotating electric machine and or electric driving control in which said hybrid vehicle is driven with motive power of said rotating electric machine without using said internal combustion engine,
    wherein said switching control portion controls said switching device such that the number of said sub-power supplies connected to said rotating electric machine is smaller during said hybrid driving control than during said electric driving control.

2. The control apparatus of the hybrid vehicle according to claim 1, wherein said switching control portion connects any one of said plurality of sub-power supplies to said rotating electric machine during said electric driving control and disconnects said plurality of sub-power supplies from said rotating electric machine during said hybrid driving control.

3. The control apparatus of the hybrid vehicle according to claim 1, wherein when a state of charge of a first sub-power supply connected to said rotating electric machine out of said plurality of sub-power supplies drops below a prescribed state during said electric driving control, said switching control portion disconnects said first sub-power supply from said rotating electric machine and connects another second sub-power supply to said rotating electric machine.

4. The control apparatus of the hybrid vehicle according to claim 3, wherein said driving control portion executes said hybrid driving control in place of said electric driving control when states of charge of all of said plurality of sub-power supplies drop below said prescribed state.

5. The control apparatus of the hybrid vehicle according to claim 1, further comprising an input portion for a driver to input a hybrid driving request indicating that driving under said hybrid driving control is requested, wherein
    said driving control portion stops said electric driving control and forcedly executes said hybrid driving control when said hybrid driving request is input during said electric driving control, and
    when said hybrid driving control is forcedly executed in response to input of said hybrid driving request, said switching control portion maintains a connection state between said rotating electric machine and any one of said plurality of sub-power supplies at the time when said hybrid driving request is input.

6. The control apparatus of the hybrid vehicle according to claim 1, wherein output voltage of said main power supply is set to a value lower than output voltage of any of said plurality of sub-power supplies.

7. The control apparatus of the hybrid vehicle according to claim 1, further comprising:
    a first converter provided between said rotating electric machine and said main power supply to convert output voltage of said main power supply into a value within a control voltage range of said rotating electric machine and output the converted output voltage to said rotating electric machine; and
    a second converter provided between said rotating electric machine and said plurality of sub-power supplies to convert output voltage of said plurality of sub-power supplies into a value within said control voltage range of said rotating electric machine and output the converted output voltage to said rotating electric machine, wherein
    a first lower limit value of an optimum control voltage range of said rotating electric machine at a time of said hybrid driving control is lower than a second lower limit value of said control voltage range of said rotating electric machine at a time of said electric driving control,
    output voltage of said main power supply is set to said first lower limit value, and
    output voltage of said plurality of sub-power supplies is set to a value between said first lower limit value and said second lower limit value.

8. The control apparatus of the hybrid vehicle according to claim 1, wherein
    a plurality of battery cells connected in series are provided inside of each of said main power supply and said plurality of sub-power supplies,
    each of said main power supply and said plurality of sub-power supplies outputs output voltage corresponding to the number of battery cells provided inside thereof,
    said main power supply is provided with the number of battery cells that brings output voltage of said main power supply to said first lower limit value, out of the total number of battery cells required to keep a possible travel distance at a time of said electric driving control at a prescribed target distance or longer, and
    said plurality of sub-power supplies are each evenly provided with the number of remaining battery cells, excluding the number of battery cells provided for said main power supply, out of said total number of battery cells.

9. The control apparatus of the hybrid vehicle according to claim 1, wherein said hybrid vehicle is a plug-in hybrid vehicle capable of charging said main power supply and said plurality of sub-power supplies with electric power from a power supply external to said vehicle.

10. A control method performed by a control apparatus of a hybrid vehicle having at least one of an internal combustion engine and a rotating electric machine as a motive power source, said control apparatus including a main power supply connected to said rotating electric machine to be capable of sending/receiving electric power to/from said rotating electric machine, a plurality of sub-power supplies capable of sending/receiving electric power to/from said rotating electric machine, and a switching device provided between said plurality of sub-power supplies and said rotating electric machine and configured to be able to connect any one of said plurality of sub-power supplies to said rotating electric machine in accordance with a given command, said control method comprising the steps of:

executing either driving control of hybrid driving control in which said hybrid vehicle is driven with motive power of at least one of said internal combustion engine and said rotating electric machine and electric driving control in which said hybrid vehicle is driven with motive power of said rotating electric machine without using said internal combustion engine; and controlling said switching device such that the number of said sub-power supplies connected to said rotating electric machine is smaller during said hybrid driving control than during said electric driving control.

11. A control apparatus of a hybrid vehicle having at least one of an internal combustion engine and a rotating electric machine as a motive power source comprising:

a main power supply connected to said rotating electric machine capable of sending/receiving electric power to/from said rotating electric machine;

a sub-power supply capable of sending/receiving electric power to/from said rotating electric machine;

a switching device provided between said sub-power supply and said rotating electric machine and configured to be able to connect said sub-power supply to said rotating electric machine in accordance with a given command;

a switching control portion controlling said switching device ; and a driving control portion executing either driving control of hybrid driving control in which said hybrid vehicle is driven with motive power of at least one of said internal combustion engine and said rotating electric machine or electric driving control in which said hybrid vehicle is driven with motive power of said rotating electric machine without using said internal combustion engine, wherein said switching control portion controls said switching device such that said main power supply is connected to said rotating electric machine during said hybrid driving control, and said main power supply and said sub-power supply are connected to said rotating electric machine during said electric driving control.

12. The control apparatus of the hybrid vehicle according to claim 11, wherein said switching control portion connects said sub-power supply to said rotating electric machine during said electric driving control and disconnects said sub-power supply from said rotating electric machine during said hybrid driving control.

13. The control apparatus of the hybrid vehicle according to claim 11, further comprising an input portion for a driver to input a hybrid driving request indicating that driving under said hybrid driving control is requested, wherein said driving control portion stops said electric driving control and forcedly executes said hybrid driving control when said hybrid driving request is input during said electric driving control, and when said hybrid driving control is forcedly executed in response to input of said hybrid driving request, said switching control portion maintains a connection state between said rotating electric machine and said sub-power supply at the time when said hybrid driving request is input.

14. The control apparatus of the hybrid vehicle according to claim 11, wherein output voltage of said main power supply is set to a value lower than output voltage of said sub-power supply.

15. The control apparatus of the hybrid vehicle according to claim 11, further comprising:

a first converter provided between said rotating electric machine and said main power supply to convert output voltage of said main power supply into a value within a control voltage range of said rotating electric machine and output the converted output voltage to said rotating electric machine; and a second converter provided between said rotating electric machine and said sub-power supply to convert output voltage of said sub-power supply into a value within said control voltage range of said rotating electric machine and output the converted output voltage to said rotating electric machine, wherein a first lower limit value of an optimum control voltage range of said rotating electric machine at a time of said hybrid driving control is lower than a second lower limit value of said control voltage range of said rotating electric machine at a time of said electric driving control, output voltage of said main power supply is set to said first lower limit value, and output voltage of said sub-power supply is set to a value between said first lower limit value and said second lower limit value.

16. The control apparatus of the hybrid vehicle according to claim 11, wherein said hybrid vehicle is a plug-in hybrid vehicle capable of charging said main power supply and said sub-power supply with electric power from a power supply external to said vehicle.

17. The control apparatus of claim 11, wherein said main power supply but not the sub-power supply is connected to said rotating electric machine during hybrid driving control.

18. A control method performed by a control apparatus of a hybrid vehicle having at least one of an internal combustion engine and a rotating electric machine as a motive power source, said control apparatus including a main power supply connected to said rotating electric machine to be capable of sending/receiving electric power to/from said rotating electric machine, a sub-power supply capable of sending/receiving electric power to/from said rotating electric machine, and a switching device provided between said sub-power supply and said rotating electric machine and configured to be able to connect said sub-power supply to said rotating electric machine in accordance with a given command, said control method comprising the steps of:

executing either driving control of hybrid driving control in which said hybrid vehicle is driven with motive power of at least one of said internal combustion engine and said rotating electric machine and electric driving control in which said hybrid vehicle is driven with motive power of said rotating electric machine without using said internal combustion engine; and controlling said switching device such that said main power supply is connected to said rotating electric machine during said hybrid driving control, and said main power supply and said sub-power supply are connected to said rotating electric machine during said electric driving control.

* * * * *

UNITED STATES PATENT AND TRADEMARK OFFICE
CERTIFICATE OF CORRECTION

| | |
|---|---|
| PATENT NO. | : 8,718,847 B2 |
| APPLICATION NO. | : 12/991959 |
| DATED | : May 6, 2014 |
| INVENTOR(S) | : K. Itagaki |

It is certified that error appears in the above-identified patent and that said Letters Patent is hereby corrected as shown below:

In the Specification

At column 6, line 9, change "the vehicle." to -- the vehicle --.

At column 13, line 34, change "and or electric" to -- or electric --.

Signed and Sealed this
Twenty-first Day of October, 2014

Michelle K. Lee
*Deputy Director of the United States Patent and Trademark Office*